United States Patent [19]

Oka et al.

[11] Patent Number: 5,494,631

[45] Date of Patent: Feb. 27, 1996

[54] APPARATUS AND METHOD FOR MANUFACTURING GOLF BALL

[75] Inventors: Kengo Oka, Kobe; Tadahiro Ebisuno, Nishinomiya; Keiji Moriyama; Kazushige Sugimoto, both of Akashi, all of Japan

[73] Assignee: Sumitomo Rubber Industries, Ltd., Hyogo, Japan

[21] Appl. No.: 286,447

[22] Filed: Aug. 5, 1994

Related U.S. Application Data

[62] Division of Ser. No. 160,746, Dec. 3, 1993.

[30] Foreign Application Priority Data

Dec. 7, 1992 [JP] Japan ................................. 4-326991

[51] Int. Cl.$^6$ ................................................ B29C 45/38
[52] U.S. Cl. .......................................... 264/161; 425/806
[58] Field of Search ........................... 425/806, 806 R, 425/289, 142, 164; 264/161, 162; 156/146

[56] References Cited

U.S. PATENT DOCUMENTS

| | | | |
|---|---|---|---|
| 1,930,167 | 10/1933 | Goodwin | 264/161 |
| 2,787,024 | 4/1957 | Smith | 264/161 |
| 4,501,715 | 2/1985 | Barfield et al. | 425/806 |
| 4,653,758 | 3/1987 | Solheim . | |
| 4,894,958 | 1/1990 | Takasaki | 264/161 |

FOREIGN PATENT DOCUMENTS

| | | | |
|---|---|---|---|
| 0295458 | 12/1988 | European Pat. Off. | 425/289 |
| 2011993 | 9/1971 | Germany | 425/806 R |
| 64-8983 | 1/1989 | Japan . | |
| 2194450 | 3/1988 | United Kingdom . | |
| 2200584 | 8/1988 | United Kingdom . | |

Primary Examiner—Timothy M. McMahon
Attorney, Agent, or Firm—Birch, Stewart, Kolasch & Birch

[57] ABSTRACT

A pair of semispherical molds, each having dimple-forming projections on a connecting portion is used to shape a resinous material into a golf ball having dimples on a seam corresponding to the connecting portion. A ball fixing means is utilized to hold the golf ball thereto with the seam uncovered. A cutting member disposed at an end of a rotary shaft, and having a radius of curvature smaller than a sectional radius of curvature of the dimple is utilized to remove a burr from the seam of the golf ball. The rotary shaft rotates on its axis and moves forward when the cutting member is brought into contact with the dimple on the seam and backward when the cutting member is brought into contact with a convex land portion. The cutting member is then pressed against the seam successively in alternate contact with the dimples and the land portions.

9 Claims, 11 Drawing Sheets

APPARATUS AND METHOD FOR MANUFACTURING GOLF BALL

This application is a divisional of copending application Ser. No. 08/160,746, filed on Dec. 3, 1993, the entire contents of which hereby incorporated by reference.

BACKGROUND OF THE INVENTION

1. Field of the Invention

The present invention relates to an apparatus and a method for manufacturing golf balls and more particularly to an apparatus and the method for removing a burr from a seam of a golf ball with high accuracy and speed, so that the golf ball has great circle paths which intersect with dimples on the surface thereof.

2. Description of the Related Arts

Figure 12:
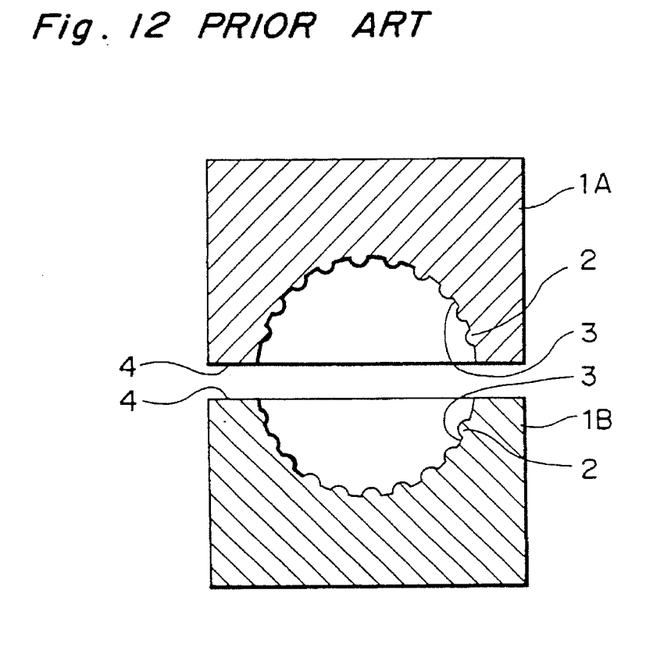
FIG. 12 is a sectional view schematically showing a pair of conventional semispherical molds to be used to shape the cover of a golf ball.

Generally, a resin is shaped into a golf ball by a pair of semispherical molds 1A and 1B as shown in FIG. 12.

That is, a concave surface 3 having dimple-forming projections 2 is formed on each of the molds 1A and 1B. When connecting portions 4 of the molds 1A and 1B are superimposed on each other, both concave surfaces 3 form a cavity. The golf ball is shaped by pressure molding or injection molding of a resin introduce into the cavity.

Figure 13:
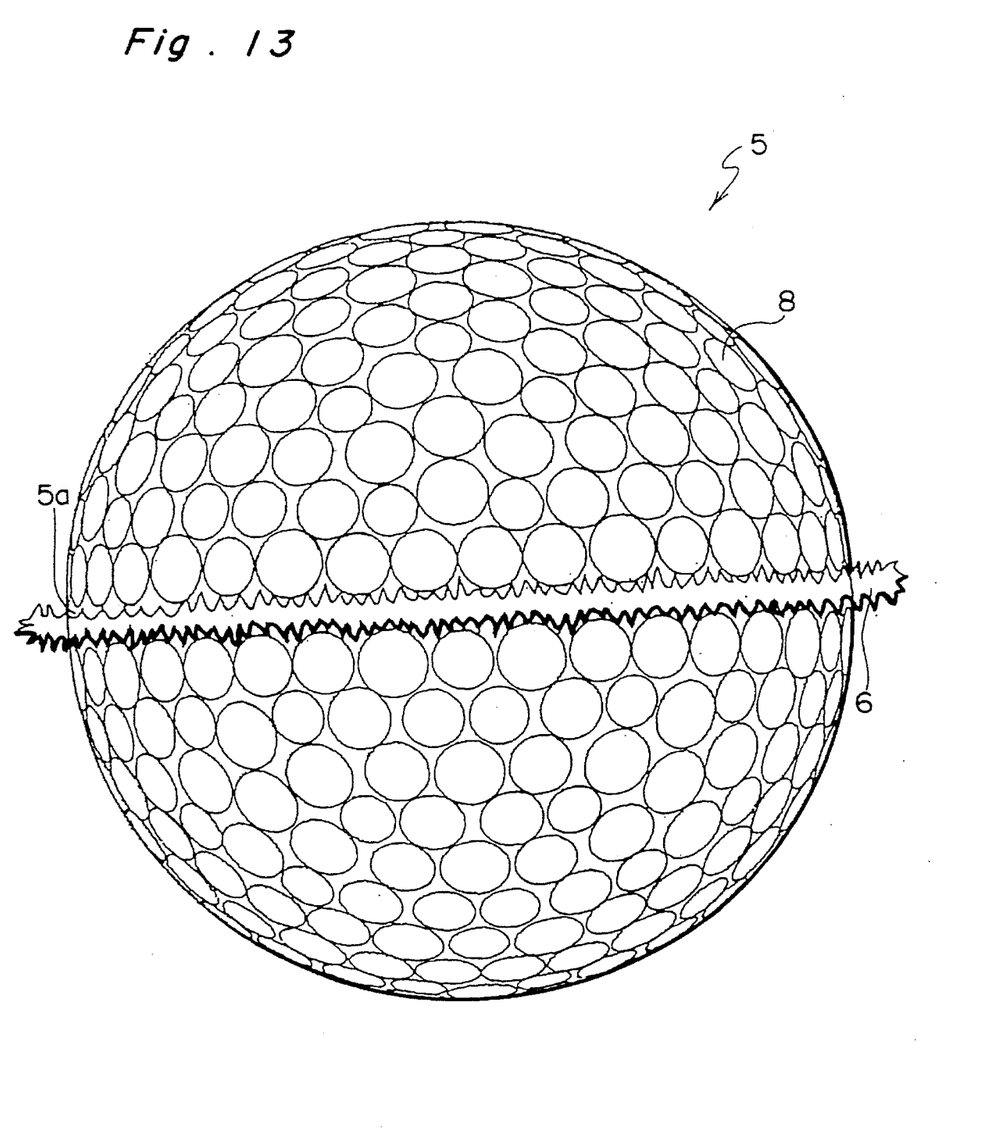
FIG. 13 is a front view showing a golf ball, the cover of which is shaped by the mold shown in FIG. 12.

As shown in FIG. 13, in a golf ball 5 formed by using the molds 1A and 1B, shown in FIG. 12 a burr 6 is formed on a portion corresponding to the connecting portions 4 of the molds 1A and 1B, namely, a seam 5a.

Figure 14:
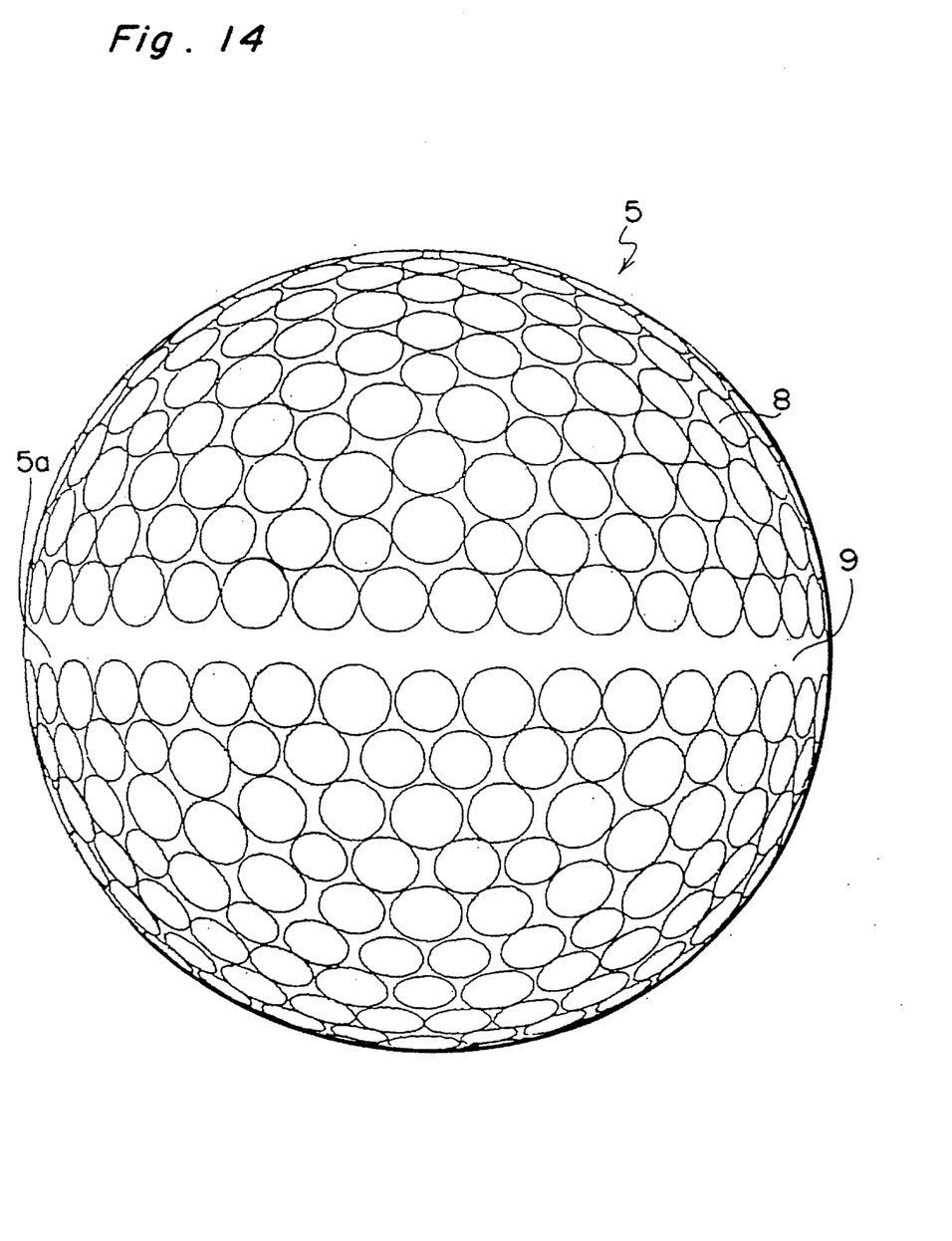
FIG. 14 is a front view showing a state in which a burr of the golf ball of FIG. 13 has been removed therefrom.

The burr 6 on the seam 5a is cut off the seam 5a in a subsequent process. But if dimples 8 are formed on the seam 5a, i.e., if the seam 5a is irregular, the burr 6 cannot be cut off the seam 5a. Thus, the dimples 8 cannot be formed on the seam 5a. Hence, dimple-forming projections 2 are not arranged in the vicinity of the connecting portion 4. Accordingly, with the removal of the burr 6 from the golf ball 5 manufactured by using the molds 1A and 1B, a great circle path 9 which does not intersect with the dimples 8 is formed on the seam 5a as shown in FIG. 14.

The great circle path 9 gives a bad influence on the flight performance of the golf ball and in particular on the aerodynamic symmetry. Therefore, methods for manufacturing a golf ball having no great circle path have been proposed as described below.

Figure 15:
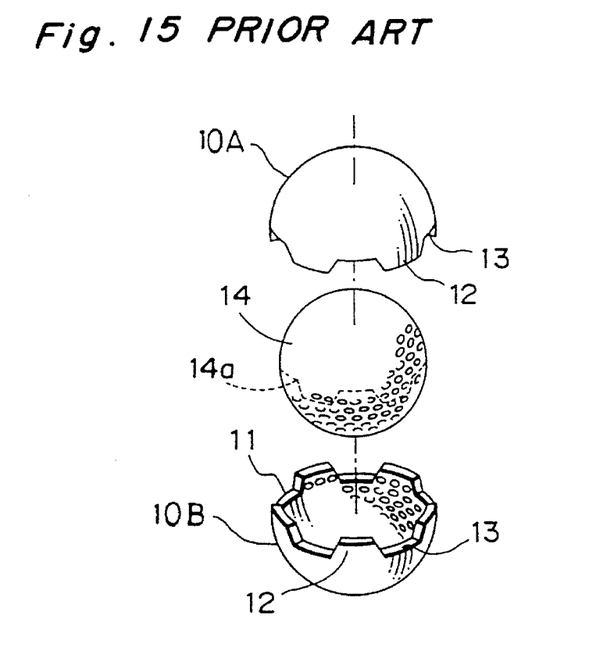
FIG. 15 is a schematic view showing an example of a conventional method for manufacturing a golf ball.

In a method disclosed in Examined Japanese Patent Publication No. 3-81394, convex portions 12 and concaves 13 are alternately formed on the connecting portion 11 of molds 10A and 10B as shown in FIG. 15. A seam 14a formed on a golf ball 14 is zigzagged in correspondence to the zigzagged configuration of the connecting portion 11 of molds 10A and 10B. In this manner, the great circle path is not formed on the surface of the golf ball 14.

As another method for manufacturing a golf ball having no great circle path thereon, dimples are not formed in the resin-molding process, but by a cutting process to be performed after the resin-molding process. This method is disclosed in Japanese Laid-Open Patent Publication No. 64-8983.

The above-described conventional methods are, however, inappropriate for mass-production of golf balls and incapable of manufacturing them with a high degree of accuracy. In fact, golf balls having a great circle path which does not intersect with dimples are unavailable on the market.

In the method disclosed in Examined Japanese Patent Publication No. 3-81394, it is necessary to shape the connecting portion 11 of the molds 10A and 10B into a complicated configuration. Therefore, it takes a considerable time to form the molds 10A and 10B into the above-described configuration, which increases manufacturing cost. In addition, the formation of the molds 10A and 10B leads to variations in size and configuration. Accordingly, it is difficult for the molds 10A and 10B to shape the resin into golf balls having a uniform dimension and configuration.

Normally, 280 to 540 dimples are formed on the surface of the golf ball. In the method disclosed in Japanese Laid-Open Patent Publication No. 64-8983, dimples are machined one by one. Therefore, it takes much time and labor and thus the method is inappropriate for mass-production. In addition, dimples have variations in dimensions and configurations.

SUMMARY OF THE INVENTION

It is an object of the present invention to provide an apparatus and a method for manufacturing a golf ball having great circle paths which intersect with dimples on the surface thereof, with a high degree of accuracy and speed.

In accomplishing these and other objects of the present invention, there is provided an apparatus for removing a burr formed on a seam of a golf ball, having dimples on the seam, shaped by means of a mold, comprising: a ball fixing means for fixing the golf ball with a seam exposed; and a cutting section comprising a cutting member, disposed at an end of a rotary shaft, having a radius of curvature smaller than a sectional radius of curvature of the dimple; the rotary shaft rotating on the axis thereof and moving forward when the cutting member is brought into contact with a concave on the seam and backward when the cutting member is brought into contact with a convex land thereon, and a driving means for driving the rotaly shaft. In this construction, the ball fixing means and/or the cutting means rotate, thereby pressing the cutting member against the seam successively.

The sectional radius of curvature means the radius of curvature of a circular arc formed by the intersection of a plane perpendicular to the axis connecting the poles and the curved surface of the dimple.

There is provided a method for manufacturing a golf ball having great circle paths which intersect with dimples, on a seam, comprising the steps of: shaping the golf ball having dimples on the seam corresponding to a connecting portion of each of a pair of semispherical molds having dimple-forming projections on the connecting portion; removing a burr from the seam by rotating a cutting member having a radius of curvature smaller than a sectional radius of curvature of the dimple and by moving the cutting member forward when the cutting member is brought into contact with a concave portion and backward when the cutting member is brought into contact with a convex land portion. In this manner, the cutting member is pressed against the seam successively.

More specifically, preferably, the fixing means retaining the golf ball is rotated on an axis perpendicular to the plane including the seam and passing through the center of the golf ball so as to press the cutting member successively against the seam. It is possible to rotate the rotary shaft of the cutting means around the fixing means so as to press the cutting member successively against the seam.

The burr-removing apparatus according to the present invention is provided with sensor means which detects whether the cutting member contacts a dimple or a convex land portion on the seam. The rotary shaft of the cutting means is moved forward or backward based on the results detected by the sensor means so that the cutting member is pressed against the seam at almost the same force.

It is possible to use an elastic means comprising a helical spring for elastically urging the rotary shaft of the cutting means toward the seam of the golf ball so that the rotary shaft is elastically moved forward when the cutting member is in contact with the dimple portion and backward when the cutting member is in contact with the land portion.

Preferably, the ball fixing means comprises upper and lower dies on which a holding concave having a radius of curvature almost equal to that of the golf ball is formed so that the golf ball is sandwiched between the upper and lower dies. Preferably, there are formed, on the holding concave, a plurality of locking projections to be inserted into the dimples of the golf ball. The locking projections are positioned on the holding concave in correspondence to the position of each dimple. In this construction, the linear and horizontal movement of the rotary shaft can be controlled according to the rotational angle of the upper and lower dies.

Preferably, the material of the cutting member is selected from a diamond file, sand paper, a metal file, and the like depending on the material of the cover of the golf ball.

According to the above construction, the golf ball is shaped by the upper and lower semipsherical molds each having dimple-forming projections at the connecting portions thereof so that dimples are formed on the seam. The burr formed on the seam is removed therefrom by the burr-removing apparatus.

That is, in the burr-removing apparatus, the fixing means retaining the golf ball is rotated on an axis perpendicular to the plane including the seam and passing through the center of the golf ball so as to press the cutting member installed at the leading end of the rotary shaft against the seam. The rotary shaft of the cutting means moves forward when the cutting member is brought into contact with the dimple while it moves backward when the cutting member is brought into contact with the convex land. In this manner, the burr formed on the lands and the dimples of the seam can be successively removed from the seam.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

An apparatus for manufacturing a golf ball according to an embodiment of the present invention will be described below with reference to FIGS. 1 through 11.

Figure 4:
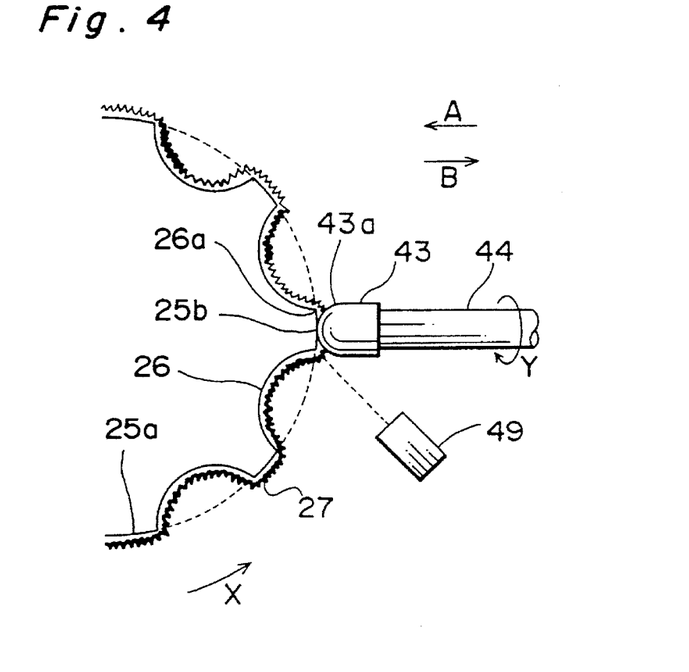
FIG. 4 is a schematic view showing the relationship between a cutting member and a golf ball.
Figure 5:
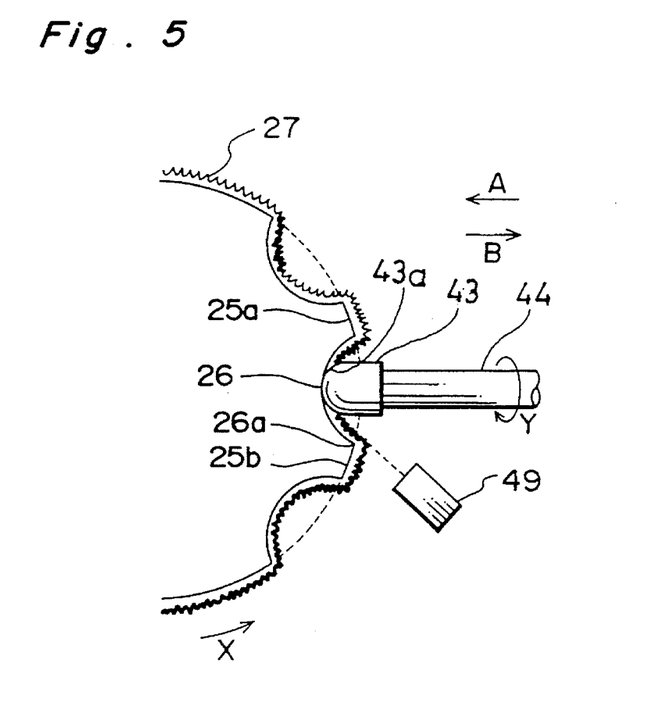
FIG. 5 is a schematic view showing the relationship between the cutting member and the golf ball.
Figure 6:
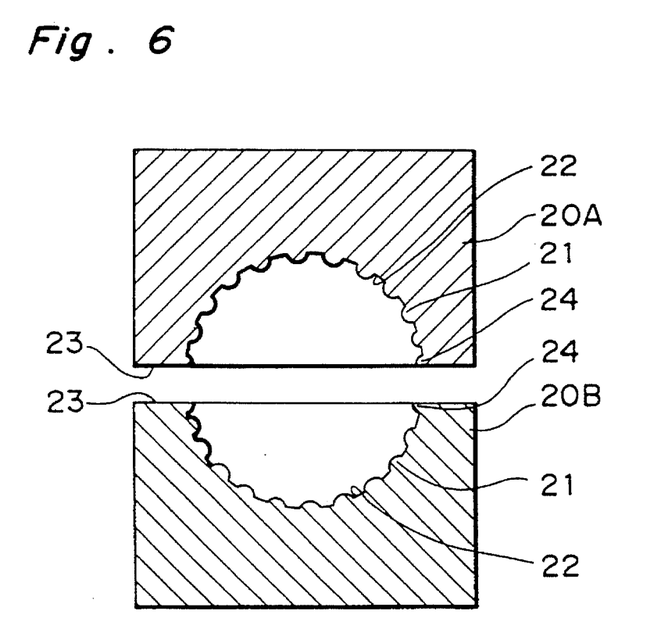
FIG. 6 is a sectional view schematically showing a pair of semispherical molds for shaping the cover of a golf ball from which a burr is removed by the apparatus shown in FIG. 1.

FIG. 1 through 5 show an apparatus for removing a burr from the seam of a golf ball shaped by a pair of semispherical molds 20A and 20B shown in FIG. 6.

A concave surface 22 having dimple-forming projections 21 is formed on each of the molds 20A and 20B. A portion corresponding to a connecting portion 23 of each concave surface 22 has a half-projection 24 formed by bisecting the projection 21 radially. The half-projections 24 opposed to each other form a dimple-forming projection when the connecting portions 23 of the molds 20A and 20B are superimposed on each other.

When the connecting portions 23 of the molds 20A and 20B are superimposed on each other, the concave surfaces 22 of the molds 20A and 20B form a cavity. A golf ball is configured by pressure molding or injection molding of a resin introduced into the cavity.

Figure 7:
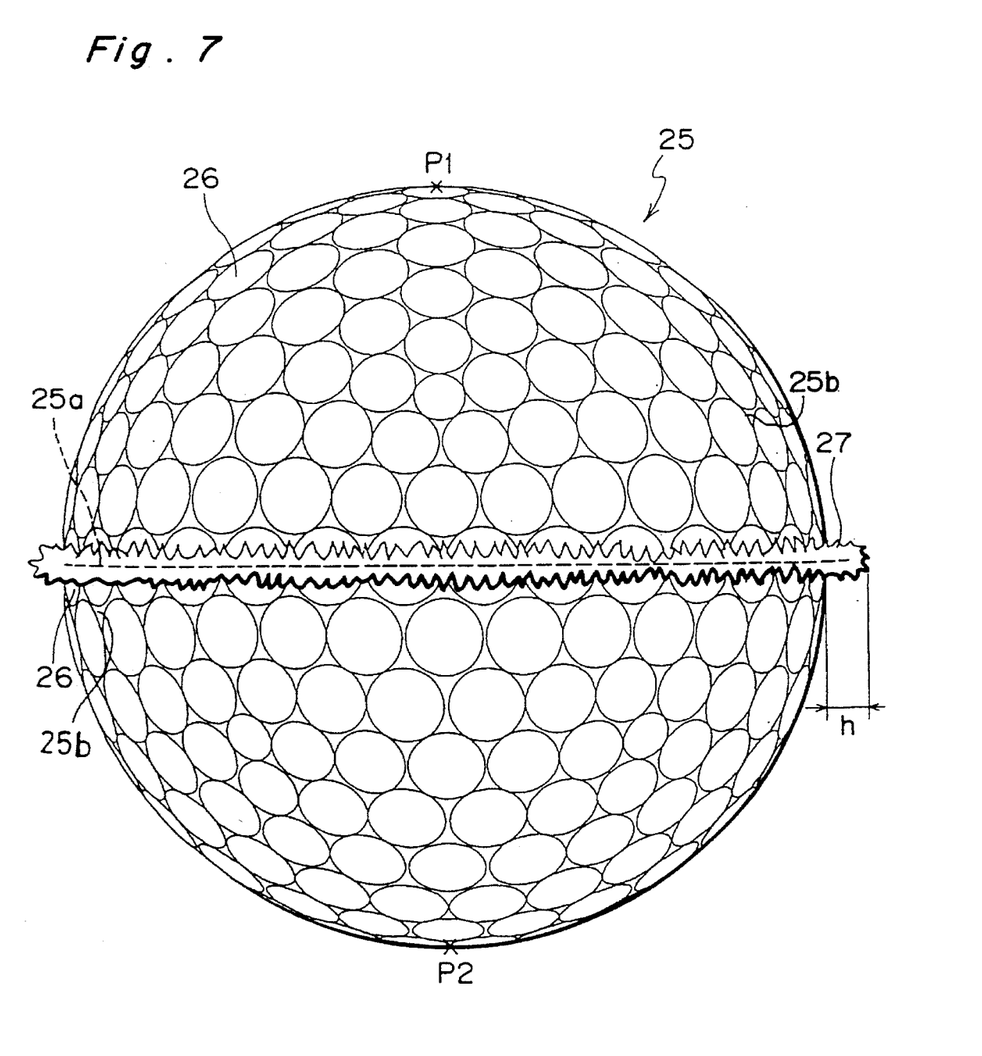
FIG. 7 is a front view showing a state in which the cover of the golf ball is shaped by the mold shown in FIG. 6.

As shown in FIG. 7, in a golf ball 25 shaped by using the molds 20A and 20B, a burr 27 as well as dimples 26 are formed on a seam 25a corresponding to the connecting portions 23 of the molds 20A and 20B. The height (h) of the burr 27 is normally 0.1 mm–2.0 mm. Not only the dimples 26, but also portions on which the dimples 26 are not formed, namely, land portions 25b are formed on the seam 25a of the golf ball 25. Thus, the seam 25a are irregular with concave and convex portions.

The apparatus for removing the burr 27 from the seam 25a as shown in FIGS. 1 through 5 comprises a ball fixing means 29 and a cutting means 30.

The ball fixing means 29 comprises an upper die 31A and a lower die 31B for holding the golf ball 25.

Figure 3A:
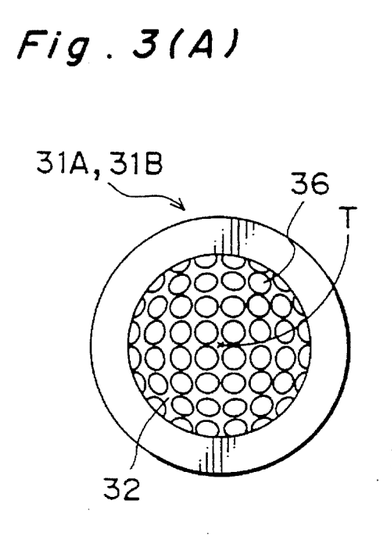
FIG. 3A is a bottom view showing upper and lower molds.
Figure 3B:
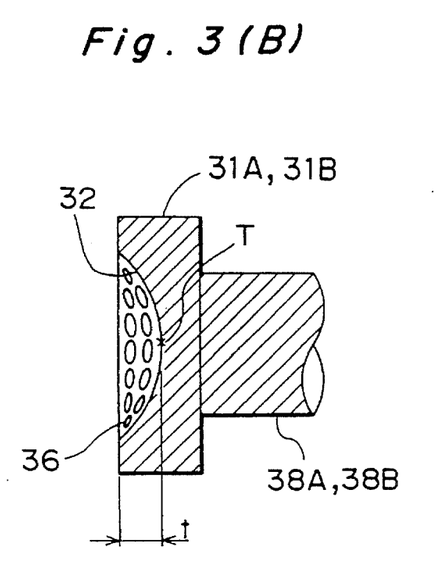
FIG. 3B is a sectional view showing the upper and lower molds of FIG. 3A.

As shown in FIG. 3, the upper and lower dies 31A and 31B have a holding concave 32, having a radius of curvature almost equal to that of the golf ball 25, on the inner surface thereof. The depth (t) of the holding concave 32 is set to be smaller than the radius of the golf ball 25. When the golf ball 25 is sandwiched between the dies 31A and the 31B, the circular arc of the golf ball 25 is exposed in a gap 34 between the dies 31A and 31B.

There are formed, on the holding concave 32, a plurality of locking projections 36 to be inserted into the dimples 26 of the golf ball 25. The locking projections 36 are positioned on the holding concave 32 in correspondence to the position of each of the dimples 26 when the golf ball 25 is held between the upper and lower dies 31A and 31B with the poles P1 and P2 of the golf ball 25 coinciding with the vertex T of each of the holding concaves In this embodiment, because the locking projections 36 are formed on the holding concave 32 in such an arrangement as described above, the seam 25a is exposed in the gap 34 when the upper and lower portions of the golf ball 25 are covered with each of the upper and lower dies 31A and 31B.

Figure 2:
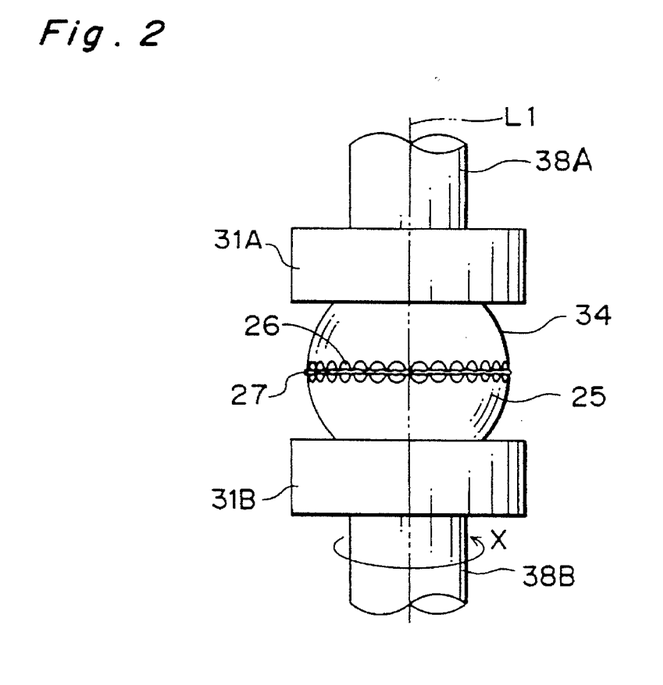
FIG. 2 is partial enlarged view showing a ball means.

The upper die 31A and the lower die 31B are connected with each of rotary shafts 38A and 38B having an axis connecting the vertexes T of the holding concaves 32 of the upper and lower dies 31A and 31B, namely, a rotary axis L1 coaxial with a line connecting the poles P1 and P2 of the golf ball 25.

Figure 1:
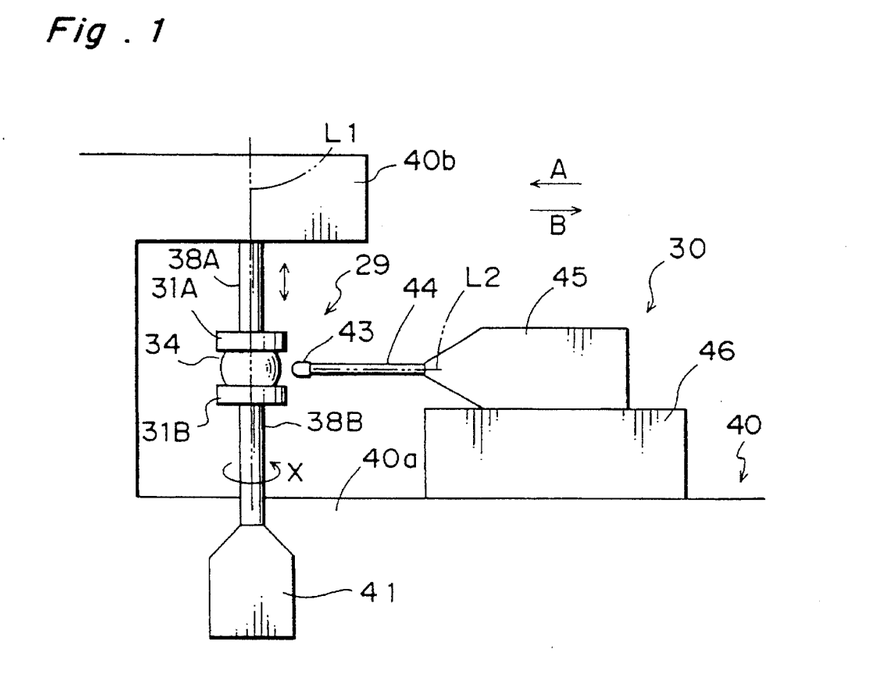
FIG. 1 is a schematic view showing an apparatus for manufacturing a golf ball according to an embodiment of the present invention.

The shaft 38A connected with the upper die 31A is rotatably supported by a supporting portion 40b disposed at an upper portion of a frame 40. The shaft 38A is slidably movable upward and downward by a driving means (not shown) disposed inside the supporting portion 40b. The shaft 38B connected with the lower die 31B is rotatably supported by a base portion 40a and connected with a first driving means 41, having a motor, at the lower end thereof. The first driving means 41 rotates the shaft 38B.

A control means (not shown) comprising a microcomputer controls the number of rotations of the first driving means 41. For example, if the cover of the golf ball is made of a soft material such as balata, the number of rotations of the first driving means 41 is set to 0.5–15 rpm, whereas if the cover of the golf ball is made of a hard material such as ionomer, the number of rotations of the first driving means 41 is set to 0.1–5 rpm.

The cutting means 30 comprises a rotary shaft 44 having a cutting member 43, made of a grindstone, installed at an end of the rotary shaft 44. The rotary shaft 44 is connected with a second driving means 45, having a motor, at the other end thereof. The second driving means 45 rotates the rotary shaft 44 on an axis L2 perpendicular to the axis L1 of the ball fixing means 29. The second driving means 45 is fixed to a moving means 46 moving forward and backward on the base portion 40a as shown by arrows A and B along the axis L2. The height of the cutting means 30 is set so that the cutting member 43 is brought into contact with the seam 25a of the golf ball 25 held by the upper and lower molds 31A and 31B of the ball fixing means 29.

A semispherical surface 43a is formed on the leading end of the cutting member 43. The radius of curvature of the semispherical surface 43a is set to be less than the sectional radius of curvature of the dimple 26. The sectional radius of curvature means the radius of curvature of a circular arc formed by the intersection of a plane F1 perpendicular to the axis connecting the poles P1 and P2 and the curved surface including burr 27 of the dimple 26.

Figure 8A:
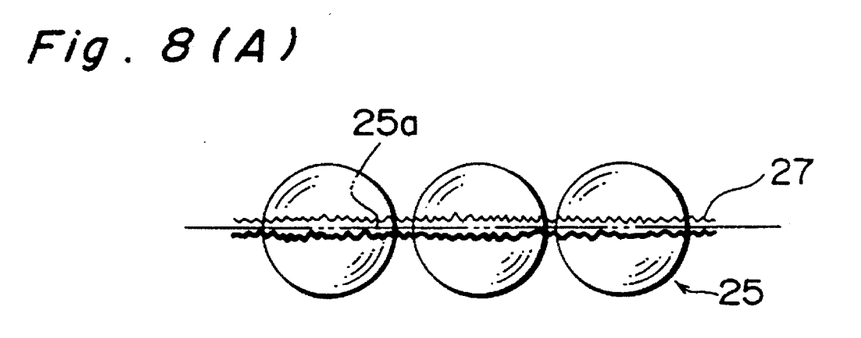
FIGS. 8A and 8B are schematic views showing the relationship between dimples and a burr.
Figure 8B:
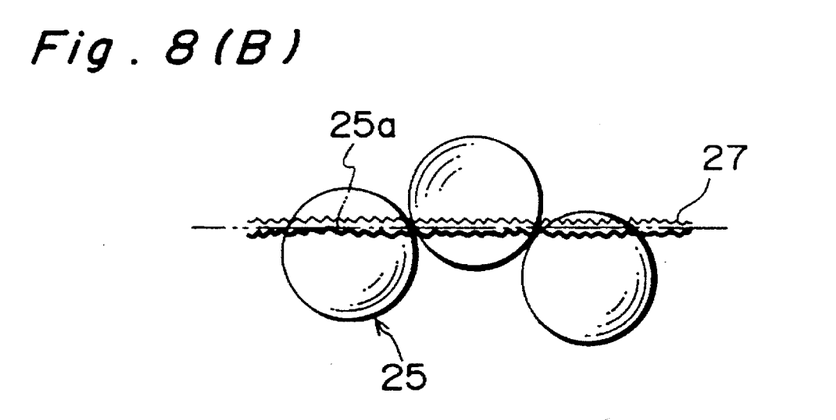

When the burr 27 passes through the center of the dimple 26, as shown in FIG. 8A, the sectional radius of curvature is the radius of curvature of the dimple 26, whereas when the burr 27 does not pass through the center of the dimple 26 as shown in FIG. 8B, the sectional radius of curvature is smaller than the radius of curvature thereof.

Normally, the radius of curvature of a dimple of a golf ball is 4.0 mm–25.0 mm. Therefore, the radius of curvature of the semispherical surface 43a of the cutting member 43 ranges from 0.5 mm to 22.0 mm. The reason the radius of curvature of the semispherical surface 43a is set in this range is as follows: If the radius of curvature of the semispherical surface 43a is set to be greater than the sectional radius of curvature, the cutting member 43 cuts an edge 26a of the dimple 26 while the burr 27 is being cut.

The control means (not shown) controls the number of rotations of the second driving means 45 depending on the material of the cover of a golf ball and the material of the cutting member 43. For example, if the cover of the golf ball is made of a soft material such as balata, the number of rotations of the rotary shaft 44 is set to 500–6000 rpm, whereas if the cover of the golf ball is made of a hard material such as ionomer, the number of rotations of the rotary shaft 44 is set to 4000–30000 rpm.

The apparatus according to this embodiment comprises a sensor means 49 for detecting whether the cutting member 43 contacts the land 25b or the dimple 26 of the seam 25a as shown in FIGS. 4 and 5. The sensor means 49 emits parallel beams to the upstream side in the rotational direction of the ball fixing means 29 with respect to a point at which the cutting member 43 is in contact with the seam 25a. Based on light rays reflected by the seam 25a, whether the cutting member 43 contacts the land 25b or the dimple 26 can be detected. According to a result detected by the sensor means 49, an instruction is outputted from the control means connected with the sensor means 49 so as to move the moving means 46 backward or forward.

That is, when the cutting member 43 is brought into contact with the land 25b, the moving means 46 is operated to move the rotary shaft 44 to move backward as shown by an arrow B, whereas when the cutting member 43 is brought into contact with the dimple 26, the moving means 46 is operated to move the rotary shaft 44 to move forward as shown by an arrow A. In this manner, the cutting member 43 is pressed against the seam 25a at a constant force regardless of whether the cutting member 43 is at the forward position or at the backward position.

The operation of the apparatus for cutting the burr 27 off the seam 25a of the golf ball 25 shown in FIG. 7 is described below.

Initially, the golf ball 25 is set on the lower die 31B of the ball fixing means 29 with the pole P2 of the golf ball 25 coinciding with the vertex T of the lower die 31B. Then, the rotary shaft 38A is moved downward, and then, the golf ball 25 is sandwiched between the upper and lower dies 31A and 31B with the poles P1 and P2 coinciding with each of the vertexes T. At this time, the seam 25a disposed in the gap 34 between the upper and lower dies 31A and 31B is positioned on a plane perpendicular to the axis L1 of the rotary shafts 38A and 38B.

Then, the first driving means 41 is operated to rotate the upper and lower dies 31A and 31B in a direction shown by X (see FIG. 1) and then, the second driving means 45 is operated to rotate the rotary shaft 44 in a direction shown by an arrow Y (see FIGS. 4 and 5.)

Thereafter, the moving means 46 is moved forward as shown by an arrow A (see FIG. 1) to press the cutting member 43 installed on the leading end of the rotary shaft 44 against the seam 25a so as to start cutting the burr 27 off the seam 25a, with the sensor means 49 operating. Because the ball fixing means 29 holding the golf ball 25 rotates, the dimples 26 and the lands 25b of the seam 25a are alternately brought into contact with the cutting member 43. In this manner, the burr 27 is removed from the seam 25a. The sensor means 49 detects whether the cutting member 43 contacts the dimple 26 or the land 25b. When the cutting member 43 is brought into contact with the dimple 26, the rotary shaft 44 moves forward, whereas when the cutting member 43 is brought into contact with the land 25b, the rotary shaft 44 moves backward. In this manner, the cutting member 43 is pressed against the seam 25a at almost the same force, thus removing the burr 27 from the seam 25a smoothly.

Further, because the radius of curvature of the semispherical surface 43a disposed at the leading end of the cutting member 43 is set to be smaller than the sectional radius of curvature of the dimple 26, the cutting member 43 does not cut the edge 26a of the dimple 26. In this manner, only the burr 27 can be reliably cut off the seam 25a with the configuration of the dimple 26 maintained.

Figure 9:
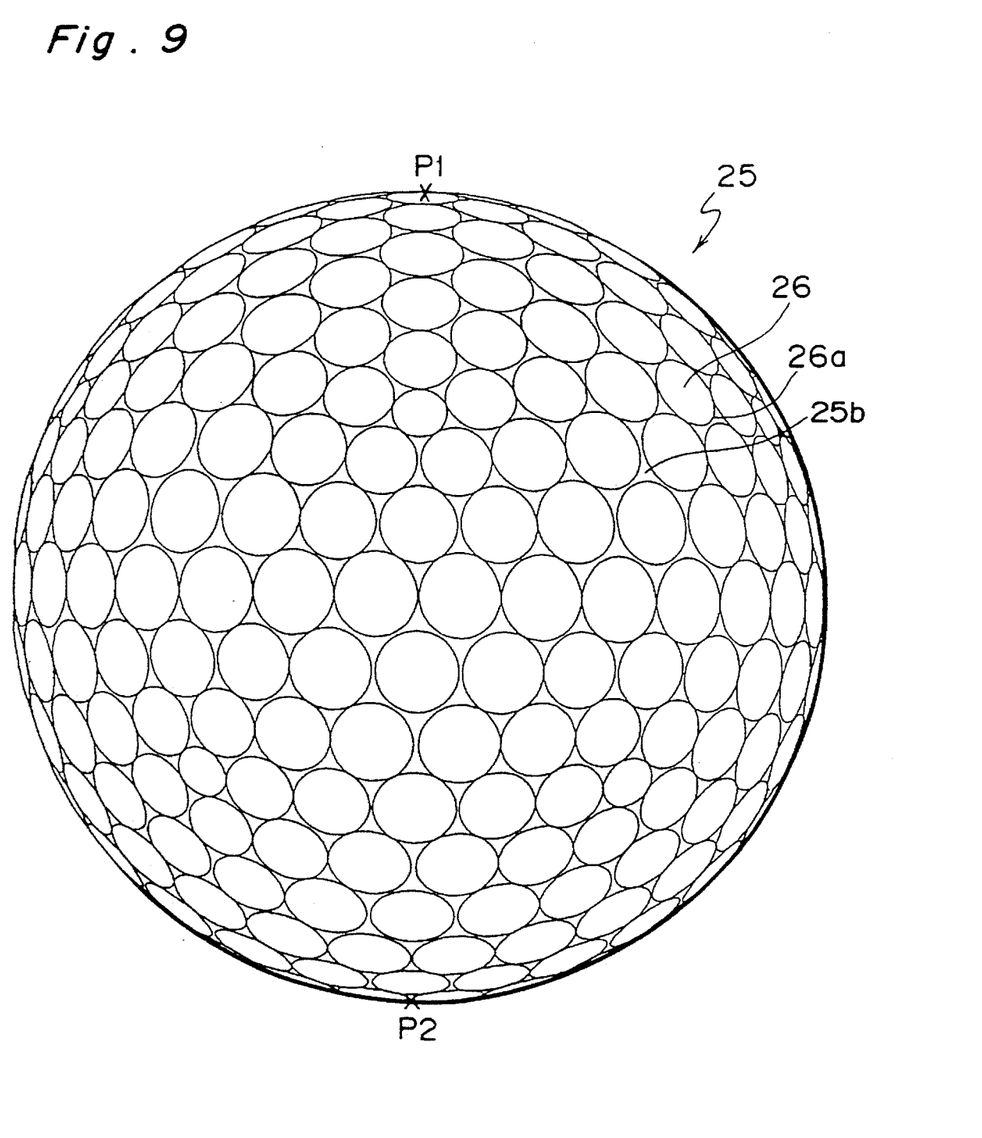
FIG. 9 is a front view showing a golf ball shaped by the apparatus shown in FIG. 1.
Figure 10:
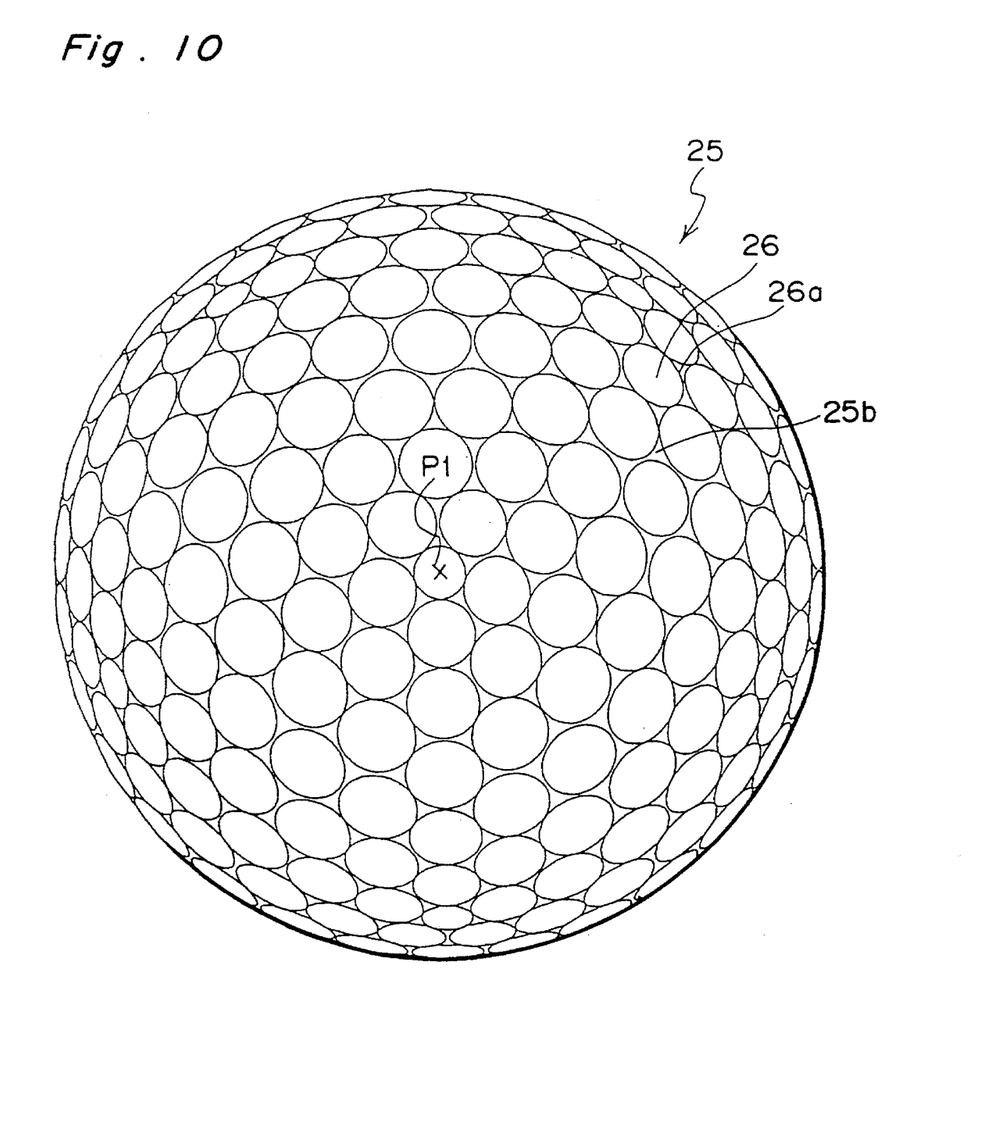
FIG. 10 is a plane view showing the golf ball shown in FIG. 9.
Figure 11:
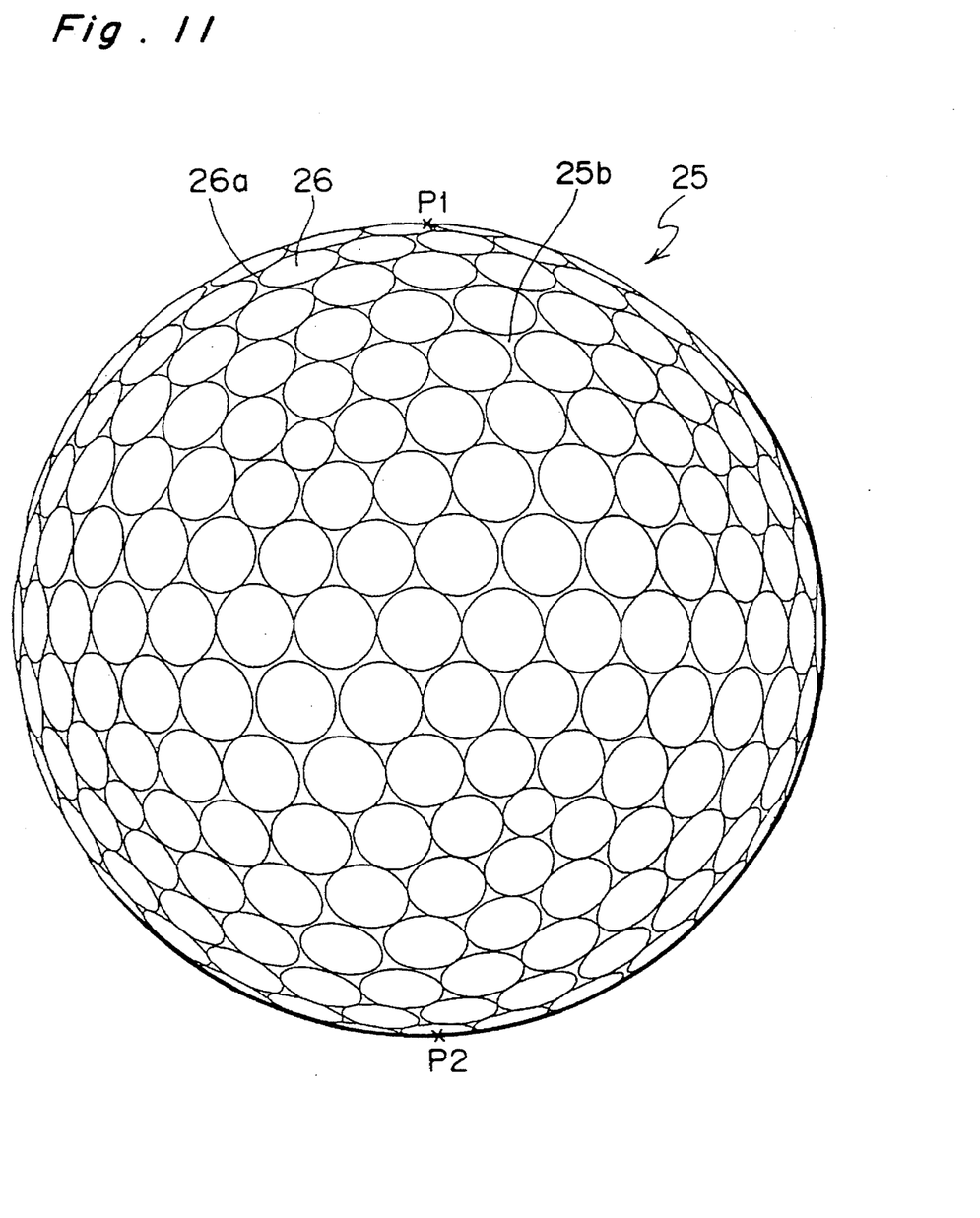
FIG. 11 is a right side view showing the golf ball shown in FIG. 9.

As shown in FIGS. 9 through 11, the golf ball manufactured by the method according to the present invention does not have a great circle path and the burr is removed from the seam 25a so favorably that the naked eye cannot detect the position of the seam at a glance.

The present invention is not limited to this embodiment, but various modifications of the present invention are possible.

As described above, in this embodiment, the ball fixing means 29 is rotated to allow the cutting member 43 to be pressed against the seam 25a, but the cutting means 30 may be rotated around the golf ball 25 retained by the fixing means 29, on the axis perpendicular to a plane including the seam 25a and passing through the center of the golf ball 25.

The rotary shaft 44 may be slidable along the axis L2 and an elastic means comprising such as a helical spring is used to elastically move the rotary shaft 44 forward as shown by the arrow A of FIG. 1. In this construction, it is unnecessary to provide the moving means 46 and the sensor means 49 and the cutting means 30 can be fixed to the frame 40.

In the above-described construction, because the elastic means contracts or expands according to whether the cutting member 43 is in contact with the dimple 26 or the land 25b of the seam 25a, the cutting member 43 smoothly contacts the dimple 26 or the land 25b. Therefore, it is unnecessary to control the position of the rotary shaft 44 along the axis L2.

It is possible to control the movement of the moving means 46 along the axis L2 without using the sensor means 49.

That is, when locking projections 36 of the upper die 31A and/or that of the lower die 31B engage the dimples 26, i.e., when the cutting member 43 is in contact with one dimple 26 as shown in FIG. 5, a rotational angle to be made by the upper and lower molds 31A at which the cutting member 43 will be brought into contact with the adjacent land 25b and with the dimple 26 adjacent to the land 25b can be apparent from the present rotational angle of the upper die 31A and/or that of the lower die 31B.

Accordingly, supposing that a portion of the seam 25a at which the cutting member 43 is in contact with the seam 25a is known, the cutting member 43 can be brought into contact with the seam 25a at a constant force by controlling the position of the rotary shaft 44 along the axis L2 according to the rotational position of the upper and lower molds 31A and 31B.

The material of the cutting member 43 may be selected from a diamond file, sand paper, a metal file, and the like depending on the material of the cover of the golf ball.

The ball fixing means 29 may be replaced with an appropriate construction so long as it can reliably hold the golf ball with the seam 25a disposed in the gap 34. Experiment Flight tests of the following golf balls were conducted: the golf ball 25, shown in FIGS. 9 through 11, manufactured according to the method of the present invention and the conventional golf ball 5, shown in FIG. 14, having the great circle path 9 formed on the seam 5a.

Each of the golf balls 25 (embodiment ball) and the conventional golf balls 5 (comparison ball) was hand-rolled and had balata cover and a liquid center. Each ball had the same structure and material-mixing proportion. Each ball had an outer diameter 42.75±0.03 mm and compression 90±2.

A swing robot (a driver (W1)) manufactured by True Temper Corp. was used to hit each ball at a head speed of 48.8 m/s.

The number of embodiment balls and comparison balls used was each 40. Of 40 balls, 20 were seam-hit and 20 were pole-hit. Seam-hitting means a way of hitting a golf ball with the rotational axis of backspin in flight coinciding with a line connecting the poles P1 and P2 thereof, whereas pole-hitting means a way of hitting the golf ball with the rotational axis of backspin in flight coinciding with a line perpendicular to the poles P1 and P2 thereof.

Table 1 shows the average of carries and trajectory heights in the case of seam-hitting and pole-hitting. Carry means a distance between a hitting point and a fall point. Trajectory height means an angle of elevation between the line connecting the highest point in the trajectory of each ball and the hitting point and a horizontal line including the hitting point.

TABLE 1

|  | Way of hitting | Carry (yard) | Trajectory height (DEG) |
| --- | --- | --- | --- |
| Embodiment ball | seam-hitting | 242.1 | 13.77 |
|  | pole-hitting | 242.7 | 13.84 |
| Comparison ball | seam-hitting | 238.3 | 13.39 |
|  | pole-hitting | 240.5 | 13.75 |

As indicated in Table 1, the difference in seam-hitting and pole-hitting in carry and trajectory height in the comparison ball is much greater than the difference in seam-hitting and pole-hitting in carry and trajectory height in the golf ball according to the present invention. That is, the golf ball according to the present invention has a more favorable aerodynamic symmetricalness than the comparison ball.

As apparent from the foregoing description, in the apparatus according to the present invention, the golf ball is fixed to the ball fixing means with the seam uncovered with the upper and lower molds of the fixing means and rotated on the axis perpendicular to the plane including the seam and passing through the center of the golf ball. Accordingly, the cutting member cuts the burr off the seam successively.

The cutting member is pressed against the seam by moving the rotary shaft forward when the cutting member is in contact with the dimple and backward when the cutting member is in contact with the land. Therefore, not only the burr formed on the land of the seam but also the burr formed on the dimple can be smoothly removed from the seam.

That is, the apparatus according to the present invention successively cuts the burr off the seam with efficiency, thereby mass-producing golf balls not having a great circle path.

Because the radius of curvature of the semispherical surface disposed at the leading end of the cutting member is set to be smaller than the sectional radius of curvature including the burr of the dimple, the cutting member does not cut the edge of the dimple. In this manner, only the burr can be reliably cut off the seam with the configuration of the dimple maintained. That is, the burr can be cut off the seam with a high accuracy.

The sensor means detects whether the cutting member contacts the dimple or the land. The rotary shaft is moved forward or backward based on a result detected by the sensor means. Therefore, the cutting member is pressed against the seam at almost the same force.

The construction in which the rotary shaft is urged toward the seam by the elastic means eliminates the need for the provision of the sensor means and thus reduces manufacturing cost.

Although the present invention has been fully described in connection with the preferred embodiments thereof with reference to the accompanying drawings, it is to be noted that various changes and modifications are apparent to those skilled in the art. Such changed and modifications are to be understood as included within the scope of the present invention as defined by the appended claims unless they depart therefrom.

What is claimed is:

1. A method for manufacturing a golf ball with dimples and land portions and having great circle paths which intersect with said dimples and which is positioned on a seam of the golf ball, said method comprising the steps of:

shaping the golf ball having dimples on the seam corresponding to a connecting portion of each of a pair of semispherical molds having dimple-forming projections on the connecting portion;

removing a burr from the seam of the golf ball by rotating a cutting member having a radius of curvature smaller than a sectional radius of curvature of the dimple and by moving the cutting member forward when the cutting member is brought into contact with a concave surface of the dimple and backward when the cutting member is brought into contact with a convex land surface, whereby the cutting member is pressed against the seam in alternate contact with the dimples and the land portions.

2. A method for manufacturing a golf ball with dimples and land portions disposed on its surface and having great circle paths which intersects with said dimples and which is positioned on a seam of the golf ball, said method comprising the steps of:

providing a pair of semispherical molds which are brought together along a connecting seam to form a ball cavity, said semispherical molds being provided with dimple-forming projections on its interior surface, including the connecting seam;

introducing a ball-forming material into said ball cavity to produce said dimpled golf ball with a burr as well as dimples formed on said connecting seam, and removing the burr from the connecting seam by moving a rotating, cutting member having a radius of curvature smaller than a sectional radius of curvature of the dimple against the connecting seam in a manner corresponding to the depth of the radius of curvature of the dimple portions and the depth of the land portions.

3. The method of claim 2 wherein the rotating, cutting member is pressed against the connecting seam in alternative contact with the dimples and the land portions.

4. The method of claim 1 wherein a sensor means is provided which senses the depth of the dimples and land portions, said sensor means controlling the movement of the cutting member.

5. The method of claim 2 wherein a sensor means is provided which senses the depth of the dimples and land portions, said sensor means controlling the movement of the cutting member.

6. The method of claim 1 wherein the ball-forming material is a resinous material.

7. The method of claim 2 wherein the ball-forming material is a resinous material.

8. The method of claim 2 wherein the golf ball is formed in said ball cavity by injection molding or pressure molding.

9. The method of claim 2 wherein during the burr-removing step the golf ball is also rotated.

* * * * *